UNITED STATES PATENT OFFICE.

GUY STERLING, OF SALT LAKE CITY, UTAH.

PROCESS OF TREATING POTASSIUM-BEARING SILICATES TO OBTAIN POTASSIUM SULFATE.

1,268,508. Specification of Letters Patent. Patented June 4, 1918.

No Drawing. Application filed September 17, 1917. Serial No. 191,847.

*To all whom it may concern:*

Be it known that I, GUY STERLING, a citizen of the United States, residing at Salt Lake City, in the county of Salt Lake and State of Utah, have invented certain new and useful Improvements in Processes of Treating Potassium-Bearing Silicates to Obtain Potassium Sulfate; and I hereby declare that the following is a full, clear, and exact description thereof, reference being had to the accompanying drawings which form part of this specification.

This invention is a novel process of extracting potash in a soluble form from silicates containing potassium in an insoluble form.

By my process I convert the potassium from its insoluble form in the silicate to a free and soluble form.

If a potassium bearing silicate and sodium sulfate are finely ground, mixed and heated to such a degree as to cause chemical reaction between the sodium sulfate and the silicate, only a part of the potassium in the silicate is converted to a soluble form unless the proportion of the sodium sulfate used with the silicate is excessive. Furthermore, when the mixture of silicate and sodium sulfate are proportioned and heated sufficiently high to bring about the desired reaction, it is difficult to prevent the vitrification of the mixture, and if vitrification takes place very little of the potassium can be extracted from the treated mixture by water, as must be done in any case to save the potassium when a partial reaction in the described mixture has taken place without vitrification.

I have discovered that when to a suitably proportioned mixture of a potassium bearing silicate and of sodium sulfate, limestone is added, (the whole being finely ground, intimately mixed) and heated, (with stirring) to about 800 degrees C. for two or three hours the mixture does not vitrify and the insoluble potassium of the silicate is converted to soluble potassium sulfate and sublimed, from which form it is readily condensed and saved.

As an example, a mixture of three parts potassium bearing silicate, two parts limestone, and one part sodium sulfate, stirred and heated to a red heat or about 800° C. produces excellent results.

Any suitable mechanical apparatus may be employed for carrying out the process commercially.

In my process I use limestone ($CaCO_3$) not lime ($CaO$). While limestone contains lime, it is a different substance from lime. Since limestone when highly heated for some time is decomposed and carbon dioxid is set free ($CaCO_3 + heat = CaO + CO_2$), it might be supposed that in a process requiring a high heat the use of limestone was equivalent to the use of lime, but in my process the use of limestone instead of lime is essential because both the lime and the carbon dioxid gas ($CO_2$) derived from the limestone are required. In carrying out the process the contained lime in the limestone chemically combines with the silicate and at the same time displaces and sets free therefrom the potassium and, in displacing the potassium, the lime contained in the limestone forms with the potassium-free silicate a product which does not lump nor form aggregates at the high heat required for the complete reaction and for the complete sublimation of the freed potassium. Furthermore, limestone requires the application of heat for some time to decompose it into $CaO$ and $CO_2$, thus forcing a more gradual displacement of the potassium by the lime than would occur if limestone were not used, and thus also allowing ample time for thoroughly mixing the potassium bearing silicate, limestone and sodium sulfate during the heating; and the gradual and even reaction thus induced prevents vitrification, lumping or aggregating of the mixture. Further by using limestone, instead of lime, the $CO_2$ gas greatly promotes the carrying off of the potassium in a sublimed form, and the chemical activity of the lime formed by the decomposition of the limestone during the heating, at the instant it is produced, is greater than after it has been allowed to cool. The lime when so produced from the limestone acts chemically on or assists chemically to convert the insoluble potassium of the silicate to a soluble form.

I use limestone not only because its contained lime is essential as a chemical reagent, but because of its retarding effect on the reaction, its prevention of vitrification and its promotion of the sublimation of the potassium in the silicate, and also because of the value of the $CO_2$ derived from the limestone in carrying off the sublimed potassium.

In developing my process I found that while I could decompose the potassium bearing silicate with sodium sulfate alone, I could only do so partially unless I used a degree of heat which caused vitrification, and although in the process of vitrification the silicate would be decomposed, the potassium would only in part be sublimed, the unsublimed part remaining in the vitrified mass from which it could not be leached by water and was thus unavailable. By adding limestone to the mixture of silicate and sodium sulfate, I found that the silicate could be decomposed without vitrification and that the potassium would all be sublimed, the potassium-free residue resulting from the treatment consisting of a loose powder of the same degree of fineness as the original mixture. It appeared, therefore, that the chemical effect of the use of sodium sulfate required to be supplemented by the chemical effect of limestone to produce the desired chemical reactions and physical results. Repeated tests of differently proportioned mixtures showed this to be a fact and that the CaO of the $CaCO_3$ had combined chemically with the residue. To obtain complete separation of the potassium from the silicate a high heat was required. The most economical and practical way to save the potassium was by sublimation.

Long application of heat, non-vitrification, of the mixture, complete sublimation of the potassium and a fine, loose residue, are essential characteristics of my process. To obtain these the use of sodium sulfate must be supplemented by limestone. Used alone, sodium sulfate is not capable of decomposing a potassium bearing silicate and vitrification or fusion takes place; used alone it only in part displaces the potassium from the silicate and only in part induces sublimation of the potassium. But when the chemical reactions occurring in the heated silicate and sodium sulfate are supplemented by the chemical effect of limestone on both the sodium sulfate and the silicate, the potassium is displaced from the silicate and sublimed and a potassium-free residue is formed which does not vitrify at the high heat required to complete the required chemical reactions.

In the foregoing statement regarding the use of limestone no mention was made of the reaction between the limestone and the sodium sulfate which takes place during the heating of the mixture of the two latter with the silicate, the final chemical combination of the CaO of the limestone with the silicate being the main thing then considered. Similarly it will be convenient to consider the resultant action of the sodium sulfate on the silicate in the same way.

In order that the sodium sulfate may act on the silicate to displace the potassium from the latter the sodium sulfate ($Na_2SO_4$) must be decomposed into sodium oxid ($Na_2O$) and sulfur trioxid ($SO_3$), thus $Na_2SO_4 = Na_2O + SO_3$, the sodium oxid then combines with the silicate and in doing so displaces from the silicate the potassium, which combines with the $SO_3$ forming potassium sulfate ($K_2SO_4$). The final chemical result on the silicate of its treatment with the lime (CaO) of the limestone ($CaCO_3$) in combination with the sodium oxid ($Na_2O$) of the sodium sulfate, is the formation of sodium-calcium-aluminum-silicate, potassium sulfate and carbon dioxid gas, in place of the original potassium-aluminum-silicate, sodium sulfate and limestone; in other words, the potassium of the silicate is displaced in part by the sodium oxid of the sodium sulfate and in part by the calcium oxid of the limestone; the displaced and freed potassium combining with the sulfur trioxid of the sodium sulfate to form potassium sulfate which in a sublimed form, in company with the carbon dioxid gas, separates from the unvitrified and unsublimable residue.

These reactions and results may be represented in chemical formula as follows:

Potassium bearing silicate = $K_2O, Al_2O_3, (SiO_2)_6$,
Limestone = $CaCO_3$,
Sodium sulfate = $Na_2SO_4$.
Then

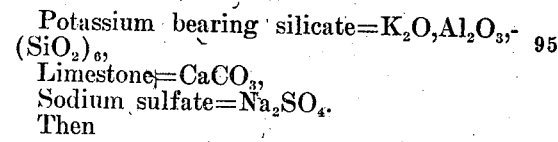

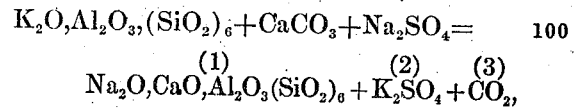

(1) being the residue, (2) the sublimed potassium sulfate and (3) the carbon dioxid gas.

In my process I use sodium sulfate in combination with limestone for the chemical effect of displacing potassium from silicates, inducing sublimation of the potassium and preventing vitrification.

In my process I use limestone (not lime) not for aggregation purposes, but for chemical purposes. The chemical effects of both the limestone and the sulfate on the silicate and its contained potassium at high heat producing a non-vitrified product, inducing complete sublimation of the potassium and promoting the escape from the residue of the sublimed potassium by the $CO_2$ given off by the limestone.

I have also found that in the above described process there may be substituted for sodium sulfate its chemical equivalent in sodium chlorid, whereby, with the use of limestone as above described, I produced, in a sublimed form, potassium chlorid.

I claim:

1. The process of extracting potassium from silicates containing potassium in an insoluble form, consisting of heating finely ground potassium bearing silicate, limestone and sodium sulfate, to a temperature approximating but below that at which vitrification of the mixture would take place and stirring the mass while heated, thereby converting the potassium of the silicate into the soluble potassium sulfate, subliming the latter by the high heat employed, and recovering the sublimed potassium sulfate.

2. The process of extracting potassium from silicates containing potassium in an insoluble form; consisting of heating, while stirring, a finely ground mixture of potassium bearing silicate, limestone and sodium sulfate, to a temperature just below that at which vitrification of the mixture would take place, thereby converting the potassium of the potassium bearing silicate into the soluble potassium sulfate, subliming the latter by the high heat employed, and condensing, and saving the sublimed potassium sulfate.

3. The process of extracting potassium from silicates containing potassium in an insoluble form, consisting in mixing finely ground silicate, limestone and sodium sulfate in approximately the proportions of three parts silicate, two parts limestone and one part sodium sulfate, heating the mixture to a temperature just below that at which vitrification would take place, subliming the potassium sulfate formed during the heating of the mixture, and condensing the sublimed potassium sulfate.

4. The process of extracting potassium from silicates containing potassium in an insoluble form, consisting in intimately mixing the finely ground silicate with finely ground limestone and sodium sulfate in approximately the proportions of three parts silicate, two parts limestone and one part sodium sulfate, stirring and heating the mixture to a temperature just below that at which vitrification would take place, subliming the potassium sulfate formed during the heating of the mixture, and condensing the sublimed potassium sulfate.

In testimony that I claim the foregoing as my own, I affix my signature.

GUY STERLING.